(12) United States Patent
Kohlenberg et al.

(10) Patent No.: US 9,996,733 B2
(45) Date of Patent: *Jun. 12, 2018

(54) USER AUTHENTICATION VIA IMAGE MANIPULATION

(71) Applicant: Intel Corporation, Santa Clara, CA (US)

(72) Inventors: Tobias Kohlenberg, Portland, OR (US); Dave Paul Singh, Portland, OR (US); Michael Solomon Richmond, Beaverton, OR (US); James Jin-koo Kim, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/213,033

(22) Filed: Jul. 18, 2016

(65) Prior Publication Data

US 2016/0328603 A1 Nov. 10, 2016

Related U.S. Application Data

(63) Continuation of application No. 13/991,780, filed as application No. PCT/US2013/030875 on Mar. 13, 2013, now Pat. No. 9,396,384.

(51) Int. Cl.
*H04N 7/18* (2006.01)
*G06K 9/00* (2006.01)
(Continued)

(52) U.S. Cl.
CPC ..... *G06K 9/00288* (2013.01); *G06F 17/3028* (2013.01); *G06F 21/31* (2013.01);
(Continued)

(58) Field of Classification Search
None
See application file for complete search history.

(56) References Cited

U.S. PATENT DOCUMENTS 8,667,561 B2   3/2014  Wang
8,978,121 B2   3/2015  Shuster
(Continued)

FOREIGN PATENT DOCUMENTS

KR    1020130021126 A    3/2013
WO    WO-2014142835 A1   9/2014

OTHER PUBLICATIONS

"U.S. Appl. No. 13/991,780, Non Final Office Action dated Oct. 20, 2015", 9 pgs.

(Continued)

*Primary Examiner* — Richard Torrente
(74) *Attorney, Agent, or Firm* — Schwegman Lundberg & Woessner, P.A.

(57) ABSTRACT

An initial image associated with a stored profile of the user is presented on a display device. Input including a manipulation of the initial image to transform the initial image to a manipulated initial image is received on an input device. The user is authenticated in response to the manipulated initial image sufficiently matching a target manipulated image associated with the stored profile of the user. Optionally, prior to presenting the initial image, a facial image of the user is captured. The user is identified by applying a facial recognition technique to the captured facial image of the user. The display device is arranged to present the initial image in response to identifying the user as having a stored profile.

20 Claims, 7 Drawing Sheets

(51) Int. Cl.
  *G06F 21/31* (2013.01)
  *G06F 21/36* (2013.01)
  *G06F 17/30* (2006.01)
  *G06T 5/00* (2006.01)
  *H04N 5/232* (2006.01)
  *H04N 5/262* (2006.01)
  *G06F 21/32* (2013.01)

(52) U.S. Cl.
  CPC .............. *G06F 21/32* (2013.01); *G06F 21/36* (2013.01); *G06K 9/00228* (2013.01); *G06K 9/00255* (2013.01); *G06T 5/00* (2013.01); *H04N 5/23293* (2013.01); *H04N 5/2628* (2013.01)

(56) References Cited

U.S. PATENT DOCUMENTS

| | | | |
|---|---|---|---|
| 9,396,384 B2 | 7/2016 | Kohlenberg et al. | |
| 2006/0288234 A1* | 12/2006 | Azar | G06F 21/32 713/186 |
| 2009/0252383 A1 | 10/2009 | Adam et al. | |
| 2012/0140091 A1 | 6/2012 | Irmatov et al. | |
| 2012/0257797 A1 | 10/2012 | Leyvand et al. | |
| 2013/0051632 A1 | 2/2013 | Tsai et al. | |
| 2014/0230045 A1* | 8/2014 | Choi | G06F 21/36 726/19 |
| 2015/0371079 A1 | 12/2015 | Kohlenberg et al. | |

OTHER PUBLICATIONS

"U.S. Appl. No. 13/991,780, Notice of Allowance dated Mar. 21, 2016", 5 pgs.

"U.S. Appl. No. 13/991,780, Response filed Jan. 20, 2016 to Non Final Office Action dated Oct. 20, 2015", 12 pgs.

"International Application Serial No. PCT/US2013/030875, International Preliminary Report on Patentability dated Sep. 24, 2015", 10 pgs.

"International Application Serial No. PCT/US2013/030875, International Search Report dated Dec. 12, 2013", 3 pgs.

"International Application Serial No. PCT/US2013/030875, Written Opinion dated Dec. 12, 2013", 8 pgs.

* cited by examiner

USER AUTHENTICATION VIA IMAGE MANIPULATION

TECHNICAL FIELD

Embodiments described herein generally relate to mechanisms for authenticating users via image manipulation.

BACKGROUND

As people's work and personal lives become increasingly dependent upon computing devices and information networks, securing access to computing devices and information networks becomes increasingly important.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings, in which.

DESCRIPTION OF EMBODIMENTS

Figure 1:
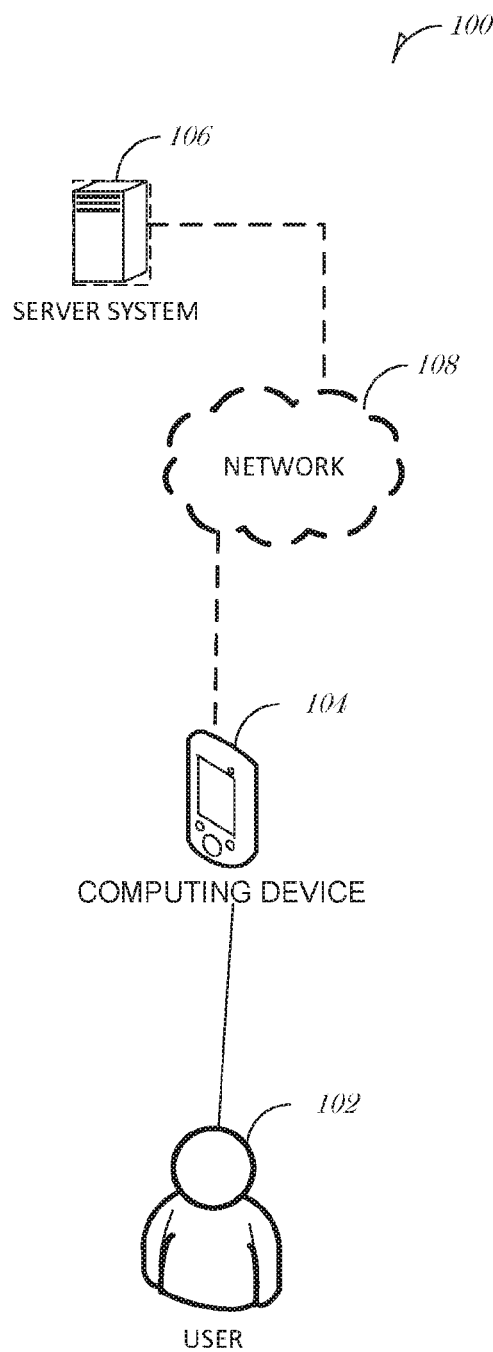
FIG. 1 is a schematic diagram illustrating a system for authenticating a user via image manipulation, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

As people's work and personal lives become increasingly dependent upon computing devices and information networks, securing access to computing devices and information networks becomes increasingly important. One technique for securing computing devices and information networks is to authenticate a user prior to giving the user access to the computing device or information network. User authentication is the act of confirming a user's identity to determine whether the user has authorization to access the device or network.

Generally, methods of authenticating a user involve having the user present one or more factors to prove the user's identity. Authentication factors may include one or more of the following: (1) Something a user knows (e.g., a password or personal identification number (PIN)); (2) Something a user has (e.g., a proximity card, smart card, or a password-generating token); or (3) Something a user is (e.g., a biometric such as a fingerprint or iris scan). "Single-factor" authentication involves the use of one of these factors to verify a user's identity. "Two-factor" authentication involves the use of two of these factors to verify a user's identity. Multi-factor authentication involves the use of two or more of these factors to verify a user's identity. The strength of security in an authentication system increases with the number of factors used to prove a user's identity. Conventionally, when two or more factors are used, the mechanism is considered a "strong" or "secure" authentication scheme.

One method for attempting to secure devices and networks includes assigning a username and a password to each user with authorization to access the device or network. When a user wishes to access the computing device or the information network, the user may enter the user's username and password, thereby authenticating the user to the computing device or information network. Although this method may benefit from not requiring any specialized hardware for authentication, this method has several disadvantages, including users that forget their usernames or passwords, usernames or passwords that are insufficiently secure, and users writing down or otherwise sharing their usernames and passwords.

Another method for attempting to secure devices and networks includes using biometric credentials, such as users' fingerprints or irises, to authenticate users. The benefits of using biometrics for authentication include not requiring administrators to assign and administer usernames and passwords, not requiring users to remember usernames and passwords, and a substantial decrease in the likelihood an attacker could impersonate another user. However, traditional methods of biometric authentication require specialized hardware, such as fingerprint readers or iris scanners, thereby increasing the cost of the system.

Thus, what are needed are authentication mechanisms that provide the increased security and convenience of authentication systems that do not require passwords, yet do not require specialized hardware. This disclosure describes several such mechanisms, which may be implemented independently from one another, or may be implemented in one or more combinations.

The first set of authentication mechanisms replaces password authentication with authentication via image manipulation. An initial image may be presented to a user, and the user may manipulate the initial image to transform the initial image into a manipulated initial image. The user is authenticated only if the manipulated initial image sufficiently matches a target manipulated image associated with the user's profile.

The second set of authentication mechanisms combines one or more of the mechanisms of the first authentication mechanism set with authentication via facial recognition. An image of the user is captured, and at least one facial recognition technique is applied to the captured image to create a candidate image. The user is authenticated only if the candidate image sufficiently matches an image of the user associated with the user's profile.

Turning to the figures, FIG. 1 is a schematic diagram illustrating a system 100 for authenticating a user via image manipulation, in accordance with some embodiments. The system 100 includes a user 102 and a computing device 104, and may optionally include a server system 106 interconnected via at least one network 108.

The computing device 104 may include, but is not limited to, devices such as a smartphone, cellular telephone, mobile phone, laptop computer, tablet computer, desktop computer, server, computer station, or computer kiosk. Although the computing device 104 is illustrated in FIG. 1 as a single machine, in some embodiments, the computing device 104 may comprise several devices, such as a camera, a display, and an input device working together.

Although the server system 106 is illustrated in FIG. 1 as a single machine, in some embodiments that include a server system 106 interconnected via a network 108, the server system 106 may comprise multiple servers working together as a colocated, distributed, or cloud-based system.

In some embodiments, the user 102 indicates to the computing device 104 that the user 102 desires to authenticate. The user 102 may indicate this desire by pressing one or more buttons, speaking an aural command, or the like. The computing device 104 then captures a facial image of the user 102. At least one facial recognition technique is then applied to the captured facial image. The user 102 is identified by matching the captured facial image to a target facial image associated with a profile of the user 102.

The computing device 104 then presents at least one initial image associated with a profile of the user 102. The user 102 then manipulates the initial image to transform the initial image into a manipulated initial image. If the manipulated initial image sufficiently matches a target manipulated image associated with the profile of the user 102, the user 102 is successfully authenticated.

In some embodiments, the authentication mechanism described is used to authenticate the user 102 to computing device 104, and does not involve the server system 106. In such embodiments, the initial image, the target manipulated image, the target facial image, and the profile of the user 102 may be stored on the computing device 104.

In some embodiments, one or more of the initial image, the target manipulated image, the target facial image, and the profile of the user 102, may be stored on the server system 106. In such embodiments, the computing device 104 may communicate with the server system 106 via network 108 to authenticate the user 102 to the computing device 104 or the server system 106.

Figure 2:
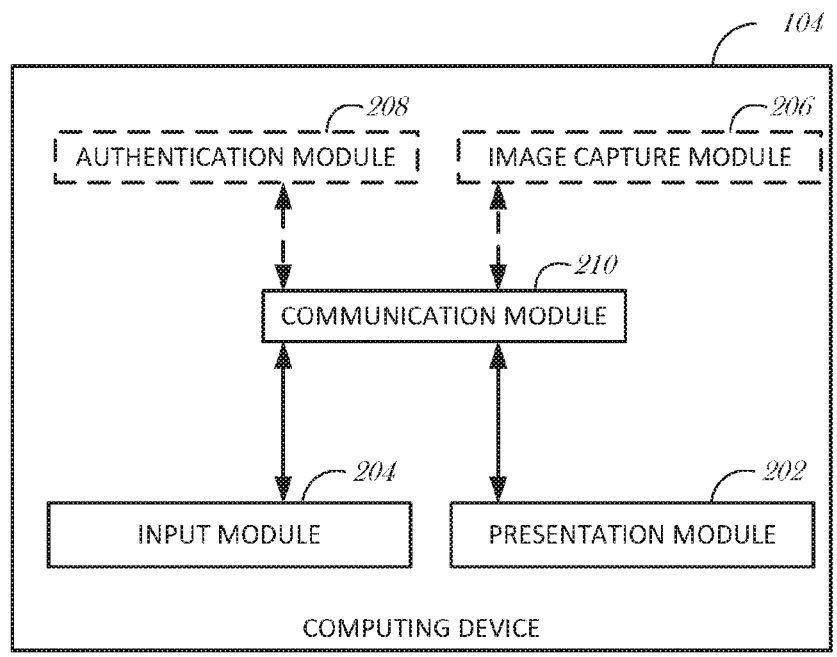
FIG. 2 is a block diagram illustrating a computing device for authenticating users via image manipulation, in accordance with some embodiments.

FIG. 2 is a block diagram illustrating a computing device 104 for authenticating users via image manipulation, in accordance with some embodiments. The computing device 104 includes a presentation module 202, an input module 204, a communication module 210, and may optionally include an image capture module 206, an authentication module 208, or both.

In various embodiments, the presentation module 202 is a cathode ray tube (CRT) monitor, a liquid crystal display (LCD) display, a light-emitting diode (LED) display, a touchscreen display, or the like. The presentation module 202 receives data representing initial image(s) front the authentication module 208 via the communication module 210, and presents images to the user 102.

In various embodiments, the input module 204 may be a touchscreen, a mouse, a keyboard, a trackball, a touchpad, a drawing pad, a joystick, or a stylus. The input module 204 receives image manipulations from the user 102 as raw data, and sends data representing the image manipulations to the authentication module 208 via the communication module 210.

In various embodiments, the image capture module 206 may be a webcam, a camera, a video camera, or the like. The image capture module 206 captures images as data and sends data representing the images to the authentication module 208 via the communication module 210.

In various embodiments, the authentication module 208 resides on the computing device 104. In such embodiments, communication between the computing device 104 and the server system 106 may not be necessary to authenticate the user 102 via image manipulation.

In some embodiments, the authentication module 208 and the image capture module 206 reside on the computing device 104. In such embodiments, communication between the computing device 104 and the server system 106 may not be necessary to authenticate the user 102 via the combination of facial recognition and image manipulation.

In other embodiments, the authentication module 208 resides on the server system 106. In such embodiments, the presentation module 202 sends, via the communication module 210 connected to the network 108, data representations of images to the computing device 104 for display to the user 102. The computing device 104 receives the data via the communication module 210 of the computing device 104, and presents the image(s) to the user 102. In such embodiments, the input module 204 receives image manipulations from the user 102 as raw data, and sends data representing the image manipulations to the authentication module 208 via the communication module 210 connected to the network 108.

In some embodiments, the presentation module 202 and the input module 204 may be one device, such as a touchscreen. In other embodiments, the presentation module 202 and the input module 204 may be separate devices, such as an LCD display and a drawing pad, respectively.

Figure 3:
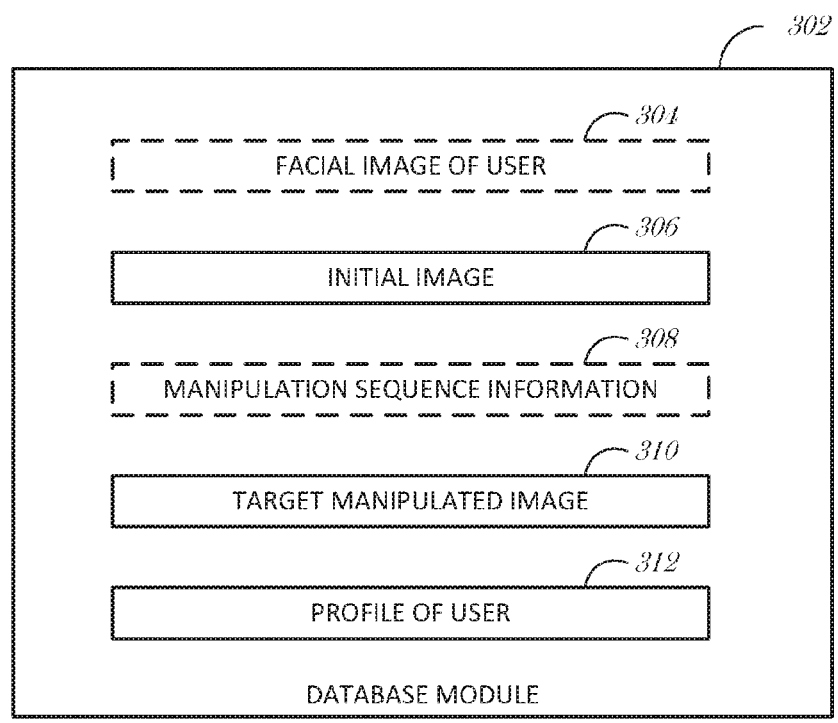
FIG. 3 is a block diagram illustrating a database module for storing authentication information of a user, in accordance with some embodiments.

FIG. 3 is a block diagram illustrating a database module 302 for storing authentication information of a user, in accordance with some embodiments. The database module 302 includes at least one initial image 306, at least one target manipulated image 310, and at least one profile 312 of user 102. In some embodiments, the database module 302 may also include at least one facial image 304 of the user 102, against which a captured facial image of the user 102 may be compared for authentication via facial recognition. In some embodiments, the database module 302 may also include manipulation sequence information 308 comprising a set or sequence of manipulations for transforming an initial image 306 into a target manipulated image 310, and may include timing information for the set or sequence of manipulations.

In some embodiments, the database module 302 may reside on the computing device 104. In such embodiments, user authentication may be performed without the computing device 104 having to communicate with the server system 106.

In some embodiments, the database module 302 may reside on server system 106. In some embodiments, the database module 302 may consist of multiple database modules 302.

Figure 4:
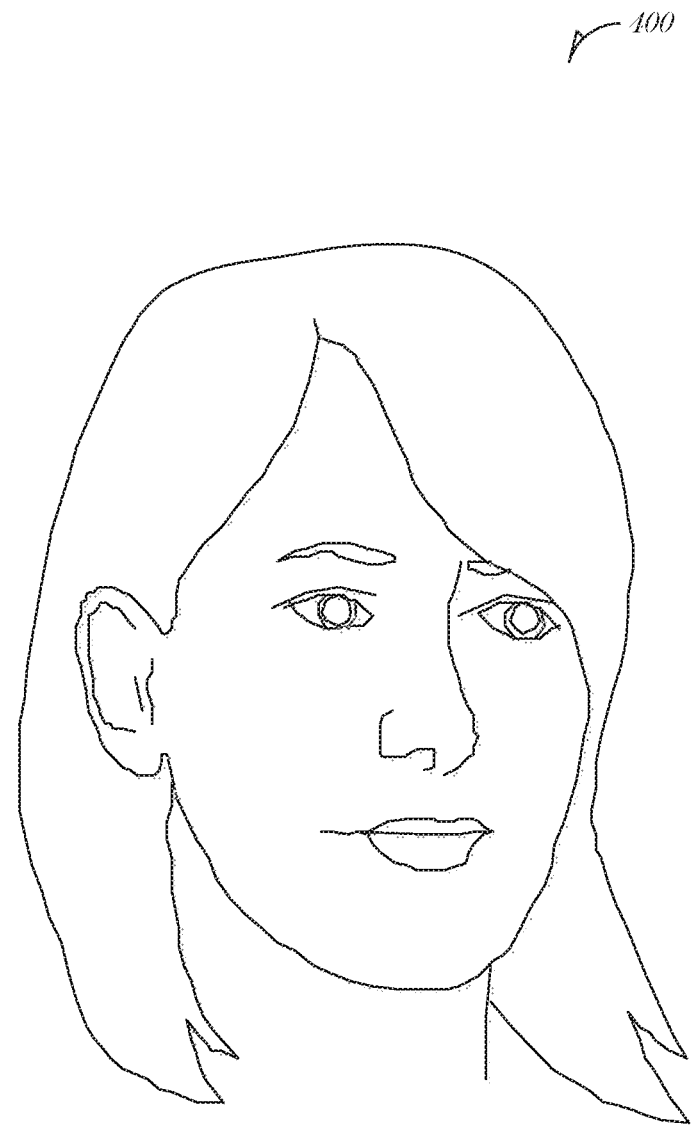
FIG. 4 is an illustration of an example initial image to be presented to a user of a system that uses image manipulation for authentication, in accordance with some embodiments.

FIG. 4 is an illustration of an example initial image 400 to be presented to a user of a system that uses image manipulation for authentication, in accordance with some embodiments. In various embodiments, the initial image 400 may be a previously captured image of the user 102, or may be an image the user 102 selected during a profile setup event.

To be authenticated, the user 102 must manipulate initial image 400 into a manipulated initial image that sufficiently matches a target manipulated image associated with a profile of the user. Image manipulations available to the user 102 may depend upon the input device(s) 208 available in computing device 104. Some possible image manipulations may include, but are not limited to, stretching, flattening, narrowing, widening, rotating, twisting, pinching, cropping, bending, flipping, moving, shearing, guillotining, zooming, blurring, sharpening, dodging, burning, painting, airbrushing, inking, penciling, erasing, coloring, and smudging. Image manipulations may be performed on the entire initial image 400, or on one or more portions of the initial image 400. In some embodiments, the initial image 400 comprises multiple initial images.

In some embodiments, image matching is performed using fuzzy logic. In such embodiments, a hash algorithm is used to create a hash value for both the target manipulated image and the manipulated initial image. The hash algorithm can be chosen such that two images that are slightly different, yet sufficiently similar to authenticate the user, may produce a similar, or identical, hash value. The matching may then be performed by comparing hash values of the manipulated initial image and the target manipulated image.

Figure 5:
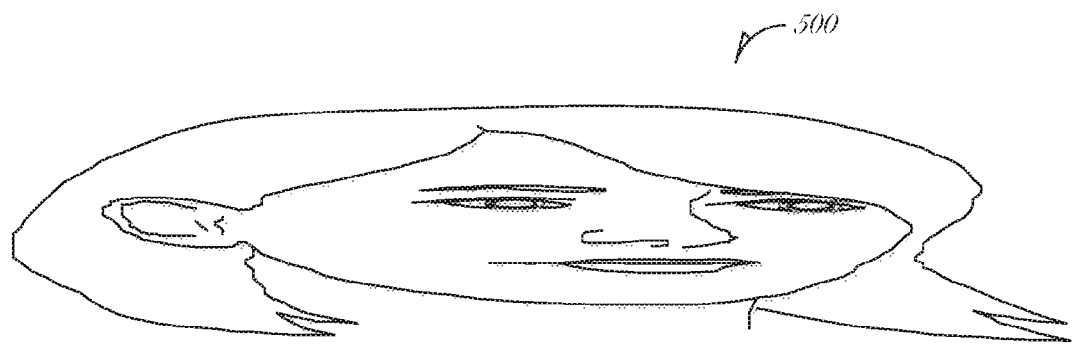
FIG. 5 is an illustration of an example manipulated initial image, in accordance with some embodiments.

FIG. 5 is an illustration of an example manipulated initial image 500, in accordance with some embodiments. In this example, the user 102 performed a widening image manipulation and a flattening image manipulation to the example initial image 400 to transform example initial image 400 into manipulated initial image 500.

Figure 6:
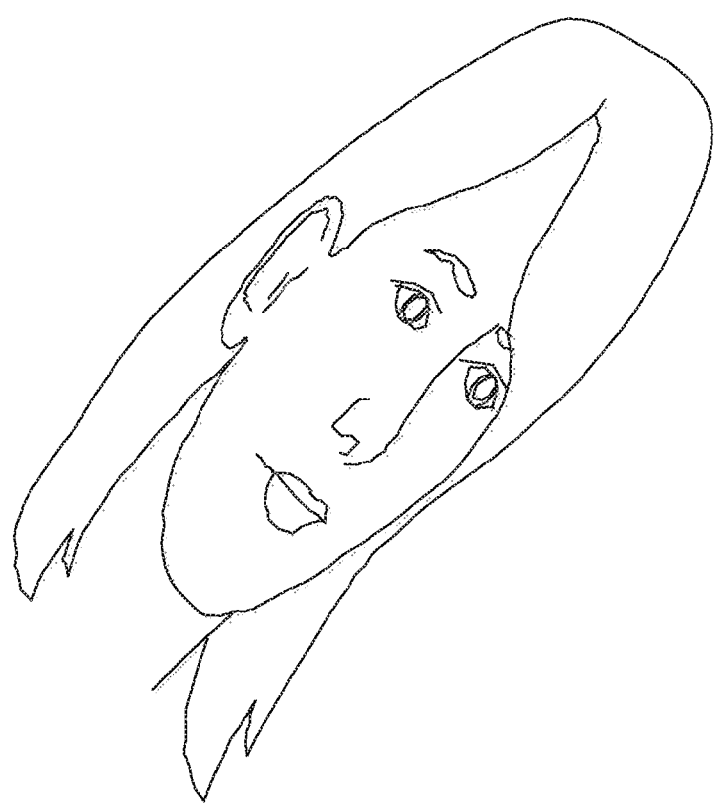
FIG. 6 is an illustration of another example manipulated initial image, in accordance with some embodiments.

FIG. 6 is an illustration of another example manipulated initial image 600, in accordance with some embodiments. In this example, the user 102 performed a narrowing image manipulation and rotating image manipulation to the example initial image 400 to transform example initial image 400 into manipulated initial image 600.

Figure 7:
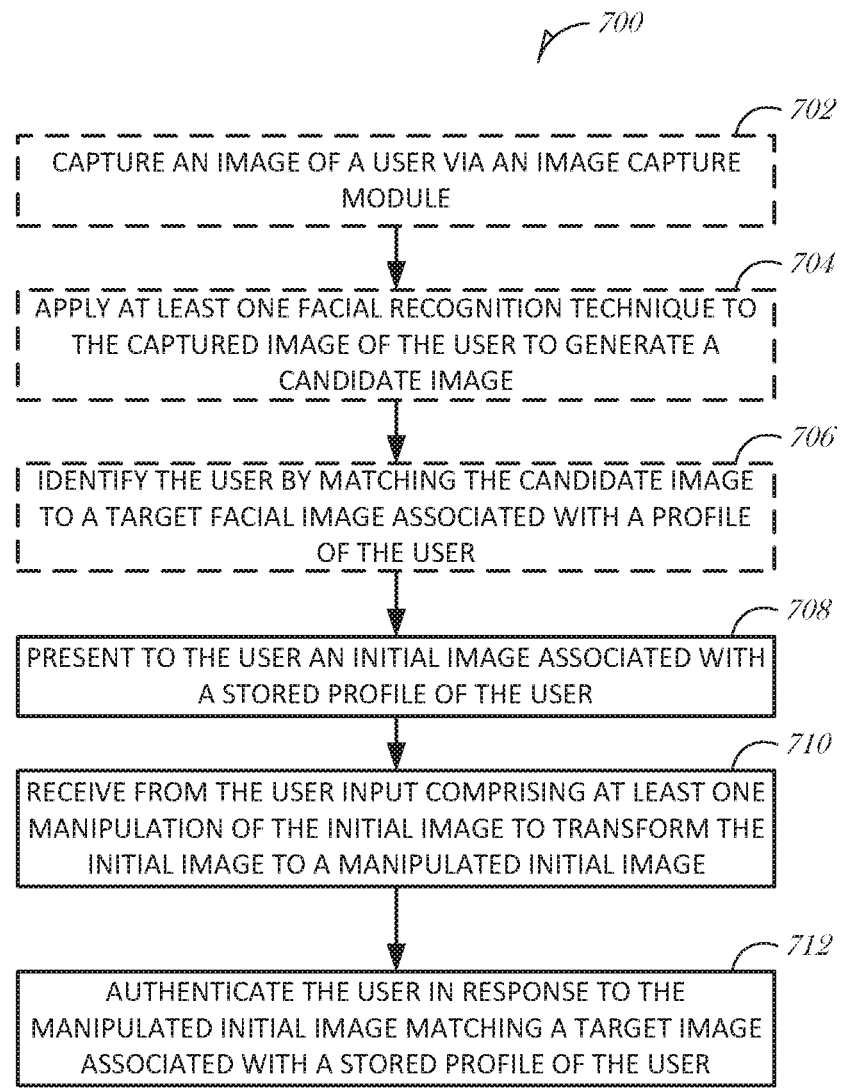
FIG. 7 is a flowchart illustrating a method for authenticating a user via image Manipulation, in accordance with some embodiments.

FIG. 7 is a flowchart illustrating a method 700 for authenticating a user via image manipulation, in accordance with some embodiments. At 702, optionally, an image of the user 102 is captured via an image capture module 206, such as a camera. At 704, optionally, at least one facial recognition technique is applied to the captured image of the user 102, generating a candidate image. At 706, optionally, the user 102 is identified by sufficiently matching the candidate image to a facial image associated with a profile of the user 102.

At 708, the user 102 is presented with an initial image associated with a stored profile of the user 102. In embodiments employing facial recognition, the initial image is retrieved based on the candidate image sufficiently matching a facial image associated with a stored profile of the user 102. In embodiments not employing facial recognition, the initial image is retrieved based on the user inputting some identifying information, such as a username, into the system.

At 710, input is received from the user 102, the input comprising at least one manipulation of the initial image to transform the initial image into a manipulated initial image.

At 712, the user 102 is authenticated in response to the manipulated initial image sufficiently matching a target manipulated image associated with a stored profile of the user 102.

In some embodiments, input received at 710 comprises a set of a plurality of image manipulations. In such embodiments, the authentication method 700 may require that the received image manipulations 710 sufficiently match a set of image manipulations associated with a target manipulated image of the user 102 for the user 102 to be authenticated.

In some embodiments, the set of image manipulations is an ordered sequence of image manipulations. In such embodiments, the authentication method 700 may require that the received image manipulations 710 sufficiently match an ordered sequence of image manipulations associated with a target manipulated image of the user 102 for the user 102 to be authenticated.

In some embodiments, the input received at 710 comprises timing information. The timing information may comprise timing information for the overall transformation of the initial image into the manipulated initial image.

For example, the timing information may comprise that the image manipulations applied to transform the initial image into the manipulated initial image took approximately 8 seconds to perform. In such embodiments, the authentication method 700 may require that the overall timing of the received image manipulations 710 sufficiently match the overall timing of image manipulations associated with a target manipulated image of the user 102 for the user 102 to be authenticated.

In some embodiments, the timing information comprises timing information for each instance of an image manipulation in the set or sequence of image manipulations. For example, the timing information may comprise that a flattening image manipulation was performed in approximately 2 seconds, a widening image manipulation was performed in approximately 1 second, and a rotating image manipulation was performed in approximately 1.5 seconds. In such embodiments, the authentication method 700 may require that the timing of each instance of the set or sequence of received image manipulations 710 sufficiently match the timing of each instance of the set or sequence of image manipulations associated with a target manipulated image of the user 102 for the user 102 to be authenticated.

In some embodiments, steps 708 through 712 may be repeated, if the profile of the user 102 is associated with multiple initial images and target manipulated images, multiple sets or sequences of image manipulations, or a combination thereof, and if an administered policy of the computing device 104 or server system 106 requires such iterative authentication via image manipulation.

In some embodiments, matching is performed using fuzzy logic. In such embodiments, each instance of an image manipulation produces a set of data to represent the image manipulation. Slightly different data representing two instances of the same type of image manipulation may produce a similar, or identical, hash value. The matching may then be performed by comparing hash values of the image manipulations.

Figure 8:
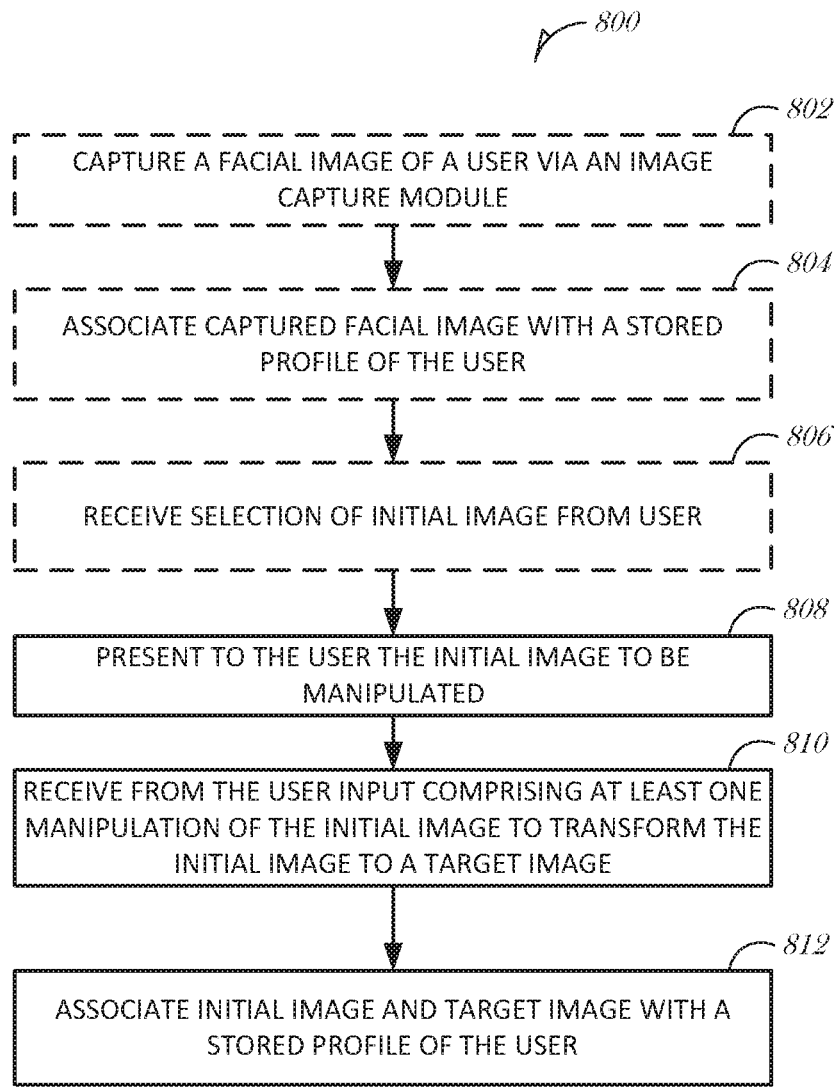
FIG. 8 is a flowchart illustrating a method for configuring a profile of a user for use in a system for authenticating users via image manipulation, in accordance with some embodiments.

FIG. 8 is a flowchart illustrating a method 800 for configuring a profile of a user for use in a system for authenticating users via image manipulation, in accordance with some embodiments. At 802, optionally, at least one facial image of user 102 is captured via an image capture module 206, such as a camera. At 804, optionally, at least one of the captured facial images of the user 102 is associated with a stored profile of the user 102.

At 806, optionally, a selection of at least one initial image is received from the user 102, the selected initial image(s) to be used for future authentications of the user 102. In some of these embodiments, an administered policy of the computing device 104 or the server system 106 may restrict or require the images that may be used for future authentications of the user 102. For example, a policy may restrict or require images based attributes such as, but not limited to, file size, bit-depth, dimensions, content, date, resolution, compression, sharpness, brightness, color, copyright, or the like. An administered policy of the computing device 104 or the server system 106 may restrict or require a minimum or maximum number of images used.

At 808, the user 102 is presented with at least one initial image that is to be used for future authentications of the user 102.

At 810, input is received from the user 102, the input comprising at least one image manipulation of at least one initial image to transform at least one initial image into at least one target manipulated image. In some embodiments, the input comprises a set of a plurality of image manipulations. In some embodiments, the set of image manipulations is an ordered sequence of image manipulations.

In some embodiments, the input comprises timing information. The timing information may comprise timing information for the overall transformation of the initial image into the target manipulated image. For example, the timing information may comprise that the image manipulations applied to transform the initial image into the target manipulated image took approximately 8 seconds to perform.

In some embodiments, the timing information comprises timing information for each instance of an image manipulation in the set or sequence of image manipulations. For example, the timing information may comprise that a flattening image manipulation was performed in approximately 2 seconds, a widening image manipulation was performed in approximately 1 second, and a rotating image manipulation was performed in approximately 1.5 seconds.

An administered policy of the computing device 104 or the server system 106 may require the set or sequence of image manipulations to have, or restrict the set or sequence of image manipulations from having, certain features or attributes. For example, a policy may require the set or sequence of image manipulations to have at least three different types of image manipulations, or require that the set or sequence of image manipulations last a minimum of five seconds. As another example, a policy may restrict the set or sequence of image manipulations from having more than 10 image manipulation instances, or restrict an image manipulation from appearing immediately after another image manipulation of the same manipulation type. In general, as the minimum requirements for image manipulations increases, the security of the authentication mechanism increases. Therefore, the policies regarding acceptable and unacceptable image manipulations may vary from organization to organization. For example, the Department of Defense may have more stringent image manipulation policies than those of a county library.

At 812, the initial image and the target manipulated image are associated with a stored profile of the user 102. In embodiments that include a set or sequence of manipulations, the set or sequence of manipulations may also be associated with a stored profile of the user 102. In embodiments that include timing information, the timing information may also be associated with a stored profile of the user 102.

In some embodiments, steps 806 through 812 may be repeated, to associate a profile of the user 102 with multiple initial images and target manipulated images, multiple sets or sequences of image manipulations, or a combination thereof.

Figure 9:
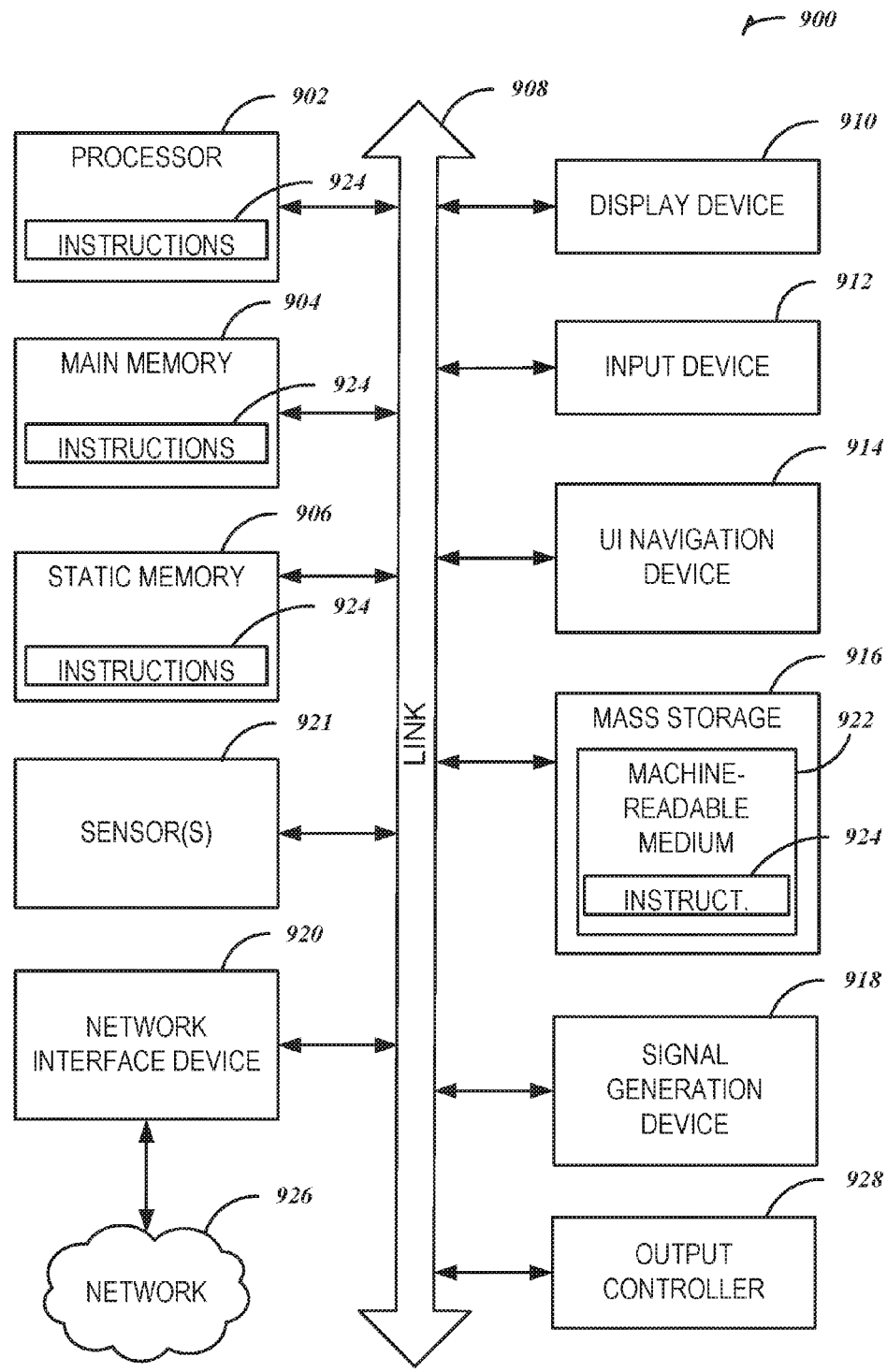
FIG. 9 illustrates a functional block diagram of an example machine, in accordance with some embodiments, upon which any one or more of the techniques (e.g., methodologies) discussed herein can perform.

FIG. 9 illustrates a functional block diagram of an example machine 900, in accordance with some embodiments, upon which any one or more of the techniques (e.g., methodologies) discussed herein can perform. In alternative embodiments, the machine 900 can operate as a standalone device or can be connected (e.g., networked) to other machines. In a networked deployment, the machine 900 can operate in the capacity of a server machine, a client machine, or both in server-client network environments. In an example, the machine 900 can act as a peer machine in peer-to-peer (P2P) (or other distributed) network environment. The machine 900 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as respective different modules at different times. Software can accordingly configure a hardware processor, for example, to constitute a particular module at one instance of time and to constitute a different module at a different instance of time.

Machine (e.g., computer system) 900 can include a hardware processor 902 (e.g., a central processing unit (CPU), a graphics processing unit (CPU), a hardware processor core, or any combination thereof), a main memory 904 and a static memory 906, some or all of which can communicate with each other via a bus 908. The machine 900 can further include a display unit 910, an alphanumeric input device 912 (e.g., a keyboard), and a uses interface (UI) navigation device 914 (e.g., a mouse). In an example, the display unit 910, input device 912 and UI navigation device 914 can be a touch screen display. The machine 900 can additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 can include an output controller 928, such as a serial (e.g., universal serial bus (USB), parallel, or other wired or wireless (e.g., infrared (IR)) connection to communicate or control one or more peripheral devices (e.g., a printer, card reader, etc.)

The storage device 916 can include a machine-readable medium 922 on which is stored one or more sets of data structures or instructions 924 (e.g., software) embodying or utilized by any one or more of the techniques or functions described herein. The instructions 924 can also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 can constitute machine-readable media.

While the machine-readable medium 922 is illustrated as a single medium, the term "machine-readable medium" can include a single medium or multiple media (e.g., a centralized or distributed database, and/or associated caches and servers) that configured to store the one or more instructions 924.

The term "machine-readable medium" can include any tangible medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples can include solid-state memories, and optical and magnetic media. Specific examples of machine-readable media can include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 can further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 920 can include one or more physical jacks (e.g., Ethernet, coaxial, or phone jacks) or one or more antennas to connect to the communications network 926. In an example, the network interface device 920 can include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

Although example machine 900 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of system 900 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 900 may include one or more processors and may be configured with instructions stored on a computer-readable storage device.

Additional Notes & Examples

The following examples pertain to further embodiments.

Example 1 may include subject matter (such as a system, apparatus, or device for authenticating a user via image manipulation) comprising a processor, a memory device, a network interface device, a presentation module arranged to display an initial image associated with at least one stored profile of the user, and an input module arranged to receive input comprising at least one manipulation of the initial image to transform the initial image to a manipulated initial image. The subject matter of Example 1 may also include a communication module stored in the memory device and executable by the processor to receive, from a server via the network interface device, data representing an initial image; send the initial image data to the presentation module; receive, from the input module, data representing at least one image manipulation to transform the initial image to a manipulated initial image; and send, to the server via the network interface device, the manipulated initial image to the server; wherein the user is authenticated in response to the manipulated initial image matching a target manipulated image associated with the at least one stored profile of the user, wherein the target manipulated image comprises the initial image manipulated by the at least one manipulation.

In Example 2, the subject matter of Example 1 may optionally include an image capture module arranged to capture a facial image of the user, wherein the user is identified via at least one facial recognition technique applied to the captured facial image of the user, and wherein the presentation module is arranged to present the initial image to the user in response to identifying the user as having a stored profile.

In Example 3, the subject matter of any of Examples 1-2 may optionally include a database module arranged to store at least one profile of the user; and an authentication module arranged to authenticate the user in response to the manipulated initial image matching a target manipulated image associated with the at least one stored profile of the user, wherein the target manipulated image comprises the initial image manipulated by the at least one manipulation.

In Example 4, the subject matter of any of Examples 1-3 may optionally include, wherein the at least one manipulation of the initial image may comprise at least one of stretching, flattening, narrowing, widening, rotating, twisting, pinching, cropping, bending, flipping, moving, shearing, guillotining, zooming, blurring, sharpening, dodging, burning, painting, airbrushing, inking, penciling, erasing, coloring, or smudging.

In Example 5, the subject matter of any of Examples 1-4 may optionally include, wherein the input module is at least one of a touchscreen, a mouse, a keyboard, a trackball, a touchpad, a drawing pad, a joystick, or a stylus.

In Example 6, the subject matter of any of Examples 1-5 may optionally include an arrangement to match the manipulated initial image and the target manipulated image using fuzzy logic.

Example 7 may include, or may optionally be combined with the subject matter of any one of Examples 1-6 to include, subject matter (such as a method, means for performing acts, or machine readable medium including instructions that, when performed by a machine cause the machine to performs acts) comprising presenting an initial image associated with a stored profile of the user; receiving input comprising at least one manipulation of the initial image to transform the initial image to a manipulated initial image; and authenticating the user in response to the manipulated initial image matching a target manipulated image associated with the stored profile of the user, wherein the target manipulated image comprises the initial image manipulated by the at least one manipulation.

In Example 8, the subject matter of any of Examples 1-7 may optionally include, wherein the at least one manipulation of the initial image may comprise at least one of stretching, flattening, narrowing, widening, rotating, twisting, pinching, cropping, bending, flipping, moving, shearing, guillotining, zooming, blurring, sharpening, dodging, burning, painting, airbrushing, inking, penciling, erasing, coloring, or smudging.

In Example 9, the subject matter of any of Examples 1-8 may optionally include, wherein the input is received by the computing device via at least one of a touchscreen, a mouse, a keyboard, a trackball, a touchpad, a drawing pad, a joystick, or a stylus.

In Example 10, the subject matter of any of Examples 1-9 may optionally include, capturing an image of the user via an image capturing module; and identifying the user via at least one facial recognition technique applied to the captured image of the user, wherein the instructions to present the initial image are arranged to be executed in response to identifying the user as having a stored profile.

In Example 11, the subject matter of any of Examples 1-10 may optionally include instructions to associate the initial image and the target manipulated image with a stored profile of the user in response to input received from the user during a stored profile setup event.

In Example 12, the subject matter of any of Examples 1-11 may optionally include, wherein the input received from the user during a stored profile setup event comprises a first sequence of a plurality of manipulations to transform the initial image into the target manipulated image; wherein the first sequence of manipulations is associated with the initial image, the target manipulated image, and a stored profile of the user; wherein the at least one manipulation of the initial image comprises a second sequence of a plurality of manipulations; and wherein the instructions to authenticate the user comprise instructions to match the first sequence of manipulations and the second sequence of manipulations.

In Example 13, the subject matter of any of Examples 1-12 may optionally include, wherein the sequences of manipulations comprise timing information.

In Example 14, the subject matter of any of Examples 1-13 may optionally include, wherein the initial image is a representation of multiple images and the target manipulated image is a representation of multiple images.

In Example 15, the subject matter of any of Examples 1-14 may optionally include, wherein the instructions to authenticate the user comprise instructions to match the manipulated initial image and the target manipulated image using fuzzy logic.

Example 16 may include, or may optionally be combined with the subject matter of any one of Examples 1-15 to include, subject matter (such as a method, means for performing acts, or machine readable medium including instructions that, when performed by a machine cause the machine to performs acts) comprising presenting, via a display device, at least one initial image; receiving, via an input device, at least one manipulation of the at least one initial image to transform the at least one initial image to at least one target manipulated image; and associating the at least one initial image, the at least one manipulation, and the at least one target manipulated image with at least one profile of the user.

In Example 17, the subject matter of any of Examples 1-16 may optionally include, wherein the at least one manipulation comprises a sequence of a plurality of manipulations.

In Example 18, the subject matter of any of Examples 1-17 may optionally include, wherein the sequence of a plurality of manipulations comprises timing information for the plurality of manipulations.

Example 19 may include, or may optionally be combined with the subject matter of any one of Examples 1-18 to include, subject matter (such as a method, means for performing acts, or machine readable medium including instructions that, when performed by a machine cause the machine to performs acts) comprising presenting, via a display device, an initial image associated with a stored profile of the user; receiving via an input device, input comprising at least one manipulation of the initial image to transform the initial image to a manipulated initial image; and authenticating the user in response to the manipulated initial image matching a target manipulated image associated with the stored profile of the user, wherein the target manipulated image comprises the initial image manipulated by the at least one manipulation.

In Example 20, the subject matter of any of Examples 1-19 may optionally include, wherein the at least one manipulation of the initial image may comprise at least one of stretching, flattening, narrowing, widening, rotating, twisting, pinching, cropping, bending, flipping, moving, shearing, guillotining, zooming, blurring, sharpening, dodging, burning, painting, airbrushing, inking, penciling, erasing, coloring, or smudging.

In Example 21, the subject matter of any of Examples 1-20 may optionally include, wherein the input device is at least one of a touchscreen, a mouse, a keyboard, a trackball, a touchpad, a drawing pad, a joystick, or a stylus.

In Example 22, the subject matter of any of Examples 1-21 may optionally include, capturing an image of the user via an image capturing device; identifying the user by applying at least one facial recognition technique to the captured image of the user; and presenting the initial image in response to identifying the user as having a stored profile.

In Example 23, the subject matter of any of Examples 1-22 may optionally include, associating the initial and target manipulated images with a stored profile of the user in response to receiving input from the user during a stored profile setup event.

In Example 24, the subject matter of any of Examples 1-23 may optionally include, wherein the input received from the user during a stored profile setup event comprises a first sequence of a plurality of manipulations to transform the initial image into the target manipulated image; wherein the first sequence of manipulations is associated with the initial image, the target manipulated image, and a stored profile of the user; wherein the at least one manipulation of the initial image comprises a second sequence of a plurality of manipulations; and wherein authenticating the user comprises matching the first sequence of manipulations and the second sequence of manipulations.

In Example 25, the subject matter of any of Examples 1-24 may optionally include, wherein the sequences of manipulations comprise timing information.

In Example 26, the subject matter of any of Examples 1-25 may optionally include, wherein the initial image is a representation of multiple images and the target manipulated image is a representation of multiple images.

In Example 27, the subject matter of any of Examples 1-26 may optionally include, wherein the matching is performed using fuzzy logic.

Example 28 may include, or may optionally be combined with the subject matter of any one of Examples 1-27 to include, subject matter (such as a system, apparatus, or device for authenticating a user via image manipulation) comprising a database module to store at least one profile of the user; a presentation module to present to the user an initial image associated with the at least one stored profile of the user; an input module to receive, from the user, input comprising at least one manipulation of the initial image to transform the initial image to a manipulated initial image; and an authentication module to authenticate the user in response to the manipulated initial image matching a target manipulated image associated with the at least one stored profile of the user, wherein the target manipulated image comprises the initial image manipulated by the at least one manipulation.

In Example 29, the subject matter of any of Examples 1-28 may optionally include an image capturing module to capture a candidate facial image from the user, wherein the presentation module is arranged to present to the user an initial image associated with the at least one stored profile of the user in response to matching the candidate facial image with a target facial image of the user.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A computing device for authenticating a user, the computing device comprising:
an image capture module to:
capture an image of a user; and
identify the user via at least one facial recognition technique applied to the captured image of the user;
a presentation module to present, in response to a determination that the user has at least one stored profile, an initial image associated with a stored profile of the user;
an input module to receive input comprising at least one manipulation of the initial image to transform the initial image into a manipulated initial image; and
an authentication module to authenticate the user in response to the manipulated initial image matching a target manipulated image associated with the stored profile of the user, wherein the target manipulated image comprises the initial image manipulated by the at least one manipulation.

2. The computing device of claim 1, further comprising:
a database module to store the stored profile of the user.

3. The computing device of claim 2, wherein the database module is to associate the initial image and the target manipulated image with the stored profile of the user in response to input received from the user during a stored profile setup event.

4. The computing device of claim 3,
wherein the input received from the user during the stored profile setup event comprises a first sequence of a plurality of manipulations to transform the initial image into the target manipulated image;
wherein the first sequence of manipulations is associated with the initial image, the target manipulated image, and the stored profile of the user;
wherein the at least one manipulation of the initial image comprises a second sequence of a plurality of manipulations; and
wherein the instructions to authenticate the user comprise instructions to match the first sequence of manipulations and the second sequence of manipulations.

5. The computing device of claim 4, wherein the sequences of manipulations comprise timing information.

6. The computing device of claim 1, wherein the at least one manipulation of the initial image comprises at least one of stretching, flattening, narrowing, widening, rotating, twisting, pinching, cropping, bending, flipping, moving, shearing, guillotining, zooming, blurring, sharpening, dodging, burning, painting, airbrushing, inking, penciling, erasing, coloring, or smudging.

7. The computing device of claim 1, wherein the input module is at least one of a touchscreen, a mouse, a keyboard, a trackball, a touchpad, a drawing pad, a joystick, or a stylus.

8. The computing device of claim 1, wherein matching the manipulated initial image and the target manipulated image is performed using fuzzy logic.

9. The computing device of claim 1, wherein the initial image is a representation of multiple images and the target manipulated image is a representation of multiple images.

10. A method of authenticating a user, the method comprising:
capturing an image of a user via an image capturing device;
identifying the user by applying at least one facial recognition technique to the captured image of the user;
sending, to a server via a network interface device and response to a determination that the user has at least one stored profile, a request for an initial image associated with a stored profile of the user;
receiving, from the server via the network interface device, data representing the initial image;
sending the data representing the initial image data to a display device;

presenting, via the display device, the initial image;
receiving, from an input device, data representing at least one image manipulation to transform the initial image into the manipulated initial image;
sending, via the network interface device, the manipulated initial image to the server; and
authenticating the user in response to the manipulated initial image matching a target manipulated image associated with the stored profile of the user, wherein the target manipulated image comprises the initial image manipulated by the at least one manipulation.

11. The method of claim 10, wherein the at least one manipulation of t initial image comprises at least one of stretching, flattening, narrowing, widening, rotating, twisting, pinching, cropping, bending, flipping, moving, shearing, guillotining, zooming, blurring, sharpening, dodging, burning, painting, airbrushing, inking, penciling, erasing, coloring, or smudging.

12. The method of claim 10, wherein the input device is at least one of a touchscreen, a mouse, a keyboard, a trackball, a touchpad, a drawing pad, a joystick, or a stylus.

13. The method of claim 10, further comprising:
associating the initial and target manipulated images with the stored profile of the user in response to receiving input from the user during a stored profile setup event.

14. The method of claim 13, wherein the input received from the user during the stored profile setup event comprises a first sequence of a plurality of manipulations to transform the initial image into the target manipulated image;
wherein the first sequence of manipulations is associated with the initial image, the target manipulated image, and the stored profile of the user;
wherein the at least one manipulation of the initial image comprises a second sequence of a plurality of manipulations; and
wherein authenticating the user comprises matching the first sequence of manipulations and the second sequence of manipulations.

15. The method of claim 14, wherein the sequences of manipulations comprise timing information.

16. The method of claim 15, wherein the initial image is a representation of multiple images and the target manipulated image is a representation of multiple images.

17. The method of claim 10, wherein matching the manipulated initial image and the target manipulated image is performed using fuzzy logic.

18. At least one non-transitory machine-readable storage medium for authenticating a user comprising a plurality of instructions that in response to being executed on a computing device, cause the computing device to:
capture an image of a user;
identify the user by applying at east one facial recognition technique to the captured image of the user;
send, to a server in response to a determination that the user has at least one stored profile, a request for an initial image associated with a stored profile of the user;
receive, from the server, data representing the initial image;
send the data representing the initial image data to a display device;
present, via the display device, the initial image;
receive, from an input device, data representing at least one image manipulation to transform the initial image into the manipulated initial image;
send the manipulated initial image to the server; and
authenticate the user in response to the manipulated initial image matching a target manipulated image associated with the stored profile of the user, wherein the target manipulated image comprises the initial image manipulated by the at least one manipulation.

19. The at least one non-transitory machine-readable storage medium of claim 18, wherein the at least one manipulation of the initial image comprises at least one of stretching, flattening, narrowing, widening, rotating, twisting, pinching, cropping, bending, flipping, moving, shearing, guillotining, zooming, blurring, sharpening, dodging, burning, painting, airbrushing, inking, penciling, erasing, coloring, or smudging.

20. The at least one non-transitory machine-readable storage medium of claim 18, wherein the input is received by the computing device via at least one of a touchscreen, a mouse, a keyboard, a trackball, a touchpad, a drawing pad, a joystick, or a stylus.

* * * * *

UNITED STATES PATENT AND TRADEMARK OFFICE
CERTIFICATE OF CORRECTION

| | | |
|---|---|---|
| PATENT NO. | : 9,996,733 B2 | Page 1 of 1 |
| APPLICATION NO. | : 15/213033 | |
| DATED | : June 12, 2018 | |
| INVENTOR(S) | : Kohlenberg et al. | |

It is certified that error appears in the above-identified patent and that said Letters Patent is hereby corrected as shown below:

On the Title Page

Item (*), in "Notice", in Column 1, Line 3, delete "days. days." and insert --days.-- therefor In the Claims In Column 14, Line 61, in Claim 10, before "response", insert --in--

In Column 15, Line 13, in Claim 11, delete "t" and insert --the-- therefor

In Column 16, Line 9, in Claim 18, delete "east" and insert --least-- therefor

Signed and Sealed this
Twenty-eighth Day of April, 2020

Andrei Iancu
*Director of the United States Patent and Trademark Office*